US009712214B2

(12) United States Patent
Ding et al.

(10) Patent No.: US 9,712,214 B2
(45) Date of Patent: Jul. 18, 2017

(54) CHANNEL STATE INFORMATION FEEDBACK METHOD FOR COORDINATED MULTI-POINT SYSTEM AND ASSOCIATED USER EQUIPMENT

(71) Applicant: SHARP KABUSHIKI KAISHA, Osaka-shi, Osaka (JP)

(72) Inventors: Ming Ding, Shanghai (CN); Renmao Liu, Shanghai (CN)

(73) Assignee: SHARP KABUSHIKI KAISHA, Osaka (JP)

( * ) Notice: Subject to any disclaimer, the term of this patent is extended or adjusted under 35 U.S.C. 154(b) by 32 days.

(21) Appl. No.: 14/771,142

(22) PCT Filed: Dec. 27, 2013

(86) PCT No.: PCT/CN2013/090707
§ 371 (c)(1),
(2) Date: Aug. 27, 2015

(87) PCT Pub. No.: WO2014/134960
PCT Pub. Date: Sep. 12, 2014

(65) Prior Publication Data
US 2016/0006487 A1    Jan. 7, 2016

(30) Foreign Application Priority Data

Mar. 4, 2013   (CN) .......................... 2013 1 0067325

(51) Int. Cl.
*H04W 4/00*    (2009.01)
*H04B 7/024*   (2017.01)
(Continued)

(52) U.S. Cl.
CPC ........... *H04B 7/024* (2013.01); *H04B 7/0417* (2013.01); *H04B 7/0486* (2013.01); *H04B 7/0626* (2013.01); *H04B 7/0632* (2013.01)

(58) Field of Classification Search
CPC .... H04B 7/024; H04B 7/0626; H04B 7/0486; H04B 7/0632
(Continued)

(56) References Cited

U.S. PATENT DOCUMENTS

2012/0202558 A1*  8/2012  Hedberg ............... H04L 5/0058
                                              455/550.1
2013/0083681 A1*  4/2013  Ebrahimi Tazeh
                          Mahalleh .............. H04L 5/0057
                                              370/252
(Continued)

FOREIGN PATENT DOCUMENTS

| CN | 102271031 A | 12/2011 |
| CN | 102546110 A | 7/2012  |
| CN | 102647751 A | 8/2012  |

OTHER PUBLICATIONS

3GPP TR 36.819 V2.0.0, 3rd Generation Partnership Project; Technical Specification Group Radio Access Network; Coordinated Multi-Point Operation for LTE Physical Layer Aspects (Release 11), Sep. 2011.
(Continued)

*Primary Examiner* — Faisal Choudhury
(74) *Attorney, Agent, or Firm* — Birch, Stewart, Kolasch & Birch, LLP (57) ABSTRACT

The present disclosure provides a method in a UE for feeding back channel state information (CSI) and the UE. The method comprises: acquiring a set of CSI processes which are configured by a transmission point (TP) to participate in multi-antenna multi-TP coordination; acquiring a sub-band (SB) inheritance which is configured by a TP for a CSI process from the set of CSI processes; calculating the CSI based on the configuration for the CSI process; and feeding the calculated CSI back to a TP. The present disclosure has the advantages of simple implementation and low signalling overhead and is applicable to enhanced 4G systems and to 5G systems.

1 Claim, 6 Drawing Sheets

(51) Int. Cl.
*H04B 7/0417* (2017.01)
*H04B 7/06* (2006.01)
*H04B 7/04* (2017.01)

(58) Field of Classification Search
USPC .......................................................... 370/329
See application file for complete search history.

(56) References Cited

U.S. PATENT DOCUMENTS

| | | | | |
|---|---|---|---|---|
| 2013/0100911 | A1* | 4/2013 | Lv | H04L 1/0026 370/329 |
| 2013/0322288 | A1 | 12/2013 | Zhang et al. | |
| 2014/0169408 | A1* | 6/2014 | Bayesteh et al. | H04B 7/0473 375/144 |

OTHER PUBLICATIONS

Ericsson, ST-Ericsson, "Rank and Subband Inheritance between CSI Processes", 3GPP TSG-RAN WG1 #70bis, R1-124625, 7.4.4, San Diego, CA, Oct. 8-Oct. 12, 2012.
ETRI, "Per-cell precoding methods for downlink joint processing CoMP", 3GPP TSG RAN WG1 Meeting #54bis, R1-083546, 11. Study Item on LTE-Advanced, Sep. 29-Oct. 3, 2008, Prague, Czech Rep.
International Search Report issued in PCT/CN2013/090707 dated Mar. 27, 2014.
Qualcomm Europe, "15.2, CoMP email summary", 3GPP TSG-RAN WG1 #58, R1-09xxxx, Aug. 24-28, 2009, Shenzhen, China.
Sharp, "7.5.1.2, Comparison between inter-CSI-RS co-phase and aggregated CQI", 3GPP TSG RAN WG1 #68b, R1-121349, Mar. 26-30, 2012, Jeju, Korea.
Written Opinion of the International Searching Authority issued in PCT/CN2013/090707 dated Mar. 27, 2014.

* cited by examiner

CHANNEL STATE INFORMATION FEEDBACK METHOD FOR COORDINATED MULTI-POINT SYSTEM AND ASSOCIATED USER EQUIPMENT

TECHNICAL FIELD

The present disclosure relates to communication technology, and more particularly, to a method for feeding back Channel State Information (CSI) in a coordinated multi-transmission point (multi-TP) mode and a user equipment (UE) in which the method is implemented.

BACKGROUND

Modern wireless mobile communication systems present two notable features: one is broad band and high rate—for example, the bandwidth of the fourth generation wireless mobile communication system may reach 100 MHz, and its downlink rate may be up to 1 Gbps; and the other is mobile interconnection, which has promoted emerging services like mobile Internet-browsing, mobile video-on-demand, and on-line navigation, etc. These two features call for advanced wireless mobile communication technologies, such as ultra high rate wireless transmission, inter-region interference suppression, reliable signal transmission in mobile environments, distributed/centralized signal processing, etc. In the enhanced $4^{th}$ generation (4G) and the $5^{th}$ generation (5G) wireless mobile communication systems of the future, various corresponding key technologies have been proposed and discussed to meet the above development requirements, which deserves extensive attention from researchers in the art.

In October of 2007, the International Telecom Union (ITU) has approved the Worldwide Interoperability for Microwave Access (WiMAX) as the fourth 3G system standard. This event, which happened at the end of the 3G era, is in fact a rehearsal of the 4G standard war. Indeed, in order to confront the challenges from the wireless IP technology represented by wireless local area network (WLAN) and WiMAX, the 3GPP organization has set out to prepare for its new system upgrade—standardization of the Long Term Evolution (LTE) system. As a quasi-4G system which is based on Orthogonal Frequency Division Multiplexing (OFDM), the LTE system had its first release published in 2009, and was subsequently put into commercial use in 2010. Meanwhile, the standardization of the 4G wireless mobile communication system was also started by 3GPP in the first half of 2008, and this system is referred to as Long Term Evolution Advanced (LTE-A). The critical standard specification for physical layer procedures of that system was completed in early 2011. In November of 2011, the ITU officially announced in Chongqing, China that the LTE-A system and the WiMAX system are two official standards for 4G systems. Nowadays, global commercialization of the LTE-A system is progressing step by step.

Although the 4G wireless mobile communication systems, represented by the LTE-A system and the WiMAX system, are able to provide users with communication services at higher rates and enhance users' experience with the services, they are still not capable of sufficiently meeting user demands in the next few years or decade. Currently, mobile communication systems serve approximately 5.5 billion users, and it is estimated that this number will rise up to 7.3 billion in 2015. This involves a significant increase in the number of smartphone users—in 2011 there were about 0.428 billion smartphones in the world, while in 2015 this number will be doubled to about 1 billion. The popularization of powerful smartphones has promoted a rapid increase in wireless mobile communication rate. In recent years, the wireless communication rate steadily doubles every year in the worldwide range. At this increasing rate, in 10 years from now, the rate of wireless mobile communication systems will have to be increased by 1000 times as compared with that of current systems to accommodate users' basic requirements for communication rates. In general, the rate mentioned above mainly refers to that of data services, which account for approximately 90% of the total traffic and include for example downloading of smartphone applications, real-time navigation, cloud based synchronization and sharing of personal information, etc. The traffic of voice services, in comparison, is not likely to increase dramatically in the next decade due to relatively slow population growth.

In addition to the challenge of increasing the wireless communication rate by 1000 times, another challenge arises from the burgeoning of mobile Internet. Currently, 70 percent of Internet accesses are initiated from mobile terminals. The next decade would be a new opportunity period for the IT industry and the major opportunity lies in that the conventional PC Internet would be gradually replaced by the mobile Internet. Then, new user habits would hasten the emergence of new service modes, such as software developing for handheld communication devices and touch screens, individual-location based social network, individual oriented cloud based information management, etc. The mobile Internet impacts the wireless mobile communication systems mainly in two aspects. First, mobile video data traffic will increase significantly, and it is expected to occupy about 66% of the overall data traffic by 2016. Due to their relatively high level of real-time property, such services as mobile video raise a higher reliability requirement for the wireless mobile communication systems. Second, in the future, most mobile data communications will occur indoors or in hotspot cells, which will also bring challenge to the coverage of the wireless mobile communication system.

Moreover, in 2020, there will be 20 billion machine-to-machine communication devices in the world, and their data traffic will increase to 500% of the current level. How to design systems to support numerous machine-to-machine communication devices is also a topic that needs to be explored in depth.

According to the challenges of the next decade, requirements for the development of the enhanced 4G wireless mobile communication system are generally as follows:

Pursuing for higher wireless broadband rates, with focus placed on optimization of local hotspot cells;

Further improving user experience, with communication services on cell edges particularly optimized;

Continuing researches on new technologies that can improve spectrum utilization efficiency, considering that it is impossible for the available spectrum to be expanded by 1000 times;

Putting into use higher frequency bands (5 GHz or higher) to obtain broader communication bandwidth;

Coordinating existing networks (2G/3G/4G, WLAN, WiMAX, etc.) to share the burden of data traffic;

Optimizations specific to different services and applications;

Strengthening systems' abilities to support massive machine-to-machine communications;

Flexible, intelligent and low cost network planning and deploying;

Devising schemes to save power consumption of networks and battery consumption of user equipments.

To meet the above requirements, in June of this year, a special working conference was held by 3GPP in Slovenia to discuss key technologies of the enhanced 4G wireless mobile communication system. In this conference, a total of 42 proposals were published and discussed, and there were three major key technologies finally adopted: Enhanced Small Cell, 3D (three dimensional) MIMO (multiple in multiple out) and Enhanced Coordinated Multi-Point communication.

Among them, the coordinated multi-point communication technology is a technology by which multiple users receive communication services from one or more TPs. Specifically, the technology enables the system to collect a user's channel state information (CSI) from distributed TPs and perform multi-point coordination and resource allocation, so as to satisfy the user's QoS requirements and make efficient use of various resources of the network as a whole. It is to be noted that the so-called TP refers to a set of multiple transmission ports corresponding to a group of downlink CSI-RS patterns, and is not limited to a conventional base station.

During the past decade, researches on coordinated multi-point communications have been flourishing, due to quick maturation of the theory of MIMO system. In MIMO systems, generalized models for uplink and downlink channels are typically referred to as a multiple access channel (MAC) model and a broadcast channel (BC) model. As is proved theoretically, there is a duality between the MAC model and the BC model in capacity domain when a UE is equipped with a single antenna, and this holds true even when multiple antennas are mounted at both the transmitter and the receiver. As is further proved theoretically, the duality still exists when each of the antennas at the transmitter and the receiver is subject to an independent power constraint. That is to say, if the antennas are grouped and the groups of antennas are virtually considered as transmitting nodes or receiving nodes, the MAC model or the BC model of a MIMO system may evolve into a coordinated multi-point communication network and may reach the upper limit of its capacity. After the fundamental problem on the upper limit of capacity was solved, researches have been carried out extensively on the coordinated multi-point communication technology, which and thus becomes a hotspot of academic research.

In industrial standardization, the coordinated multi-point communication technology receives extensive attentions as well and has been preliminarily applied to the 4G wireless mobile communication system. For example, in the LTE-A systems, a scheme called Coordinated Multi Points (CoMP) has been adopted and is mainly applied in downlink. Additionally, multi-TP joint reception in uplink is an optional scheme for TPs. However, in the 4G wireless mobile communication systems, only the non-coherent CoMP scheme, which is easy to implement, is considered.

With regard to the multi-antenna multi-TP coordination, an outline is available from the standard document: 3GPP TR 36.819 V2.0.0 (2011 September), "Coordinated Multi-Point Operation for LTE physical layer aspects (Release 11)", which can be summarized as follows:

To receive a multi-antenna multi-TP service, a UE needs to report, for a set of TPs, channel state/statistical information of a link between the UE and each of the set of TPs. This set of TPs is referred to as a measurement set for multi-antenna multi-TP transmission.

The set of TPs for which the UE actually performs information feedback can be a subset of the measurement set and is referred to as a coordination set for multi-antenna multi-TP transmission. Obviously, the coordination set for multi-antenna multi-TP transmission can be the same as the measurement set for multi-antenna multi-TP transmission.

A TP in the coordination set for multi-antenna multi-TP transmission can participate in transmission of Physical Downlink Shared Channel (PDSCH, which is the UE's data channel) to the UE, either directly or indirectly.

The scheme in which multiple TPs directly participate in coordinated transmission is referred to as Joint Processing (JP). The JP scheme requires PDSCH signal intended for the UE to be shared among the multiple TPs participating in the coordination and can be subdivided into two approaches. One is referred to as Joint Transmission (JT) in which the multiple TPs transmit their PDSCH signals to the UE simultaneously. The other one is referred to as Dynamic Point Selection (DPS) and Dynamic Point Blanking (DPS), in which at any time only one of the TPs which has the strongest signal link is selected to transmit its PDSCH signal to the UE while signal links of the other TPs are disabled.

The scheme in which multiple TPs indirectly participate in coordinated transmission is referred to as Coordinated Beamforming/Coordinated Scheduling (CB/CS). In the CB/CS scheme, beams/resources for transmitting PDSCHs to different UEs are coordinated among the multiple TPs to suppress interference between each other. It is not required to share PDSCH signal intended for the UE among the multiple TPs participating in the coordination.

For a UE operating in the coordinated multi-antenna multi-TP transmission environment, information feedback is mainly carried out separately for each TP and is transmitted over uplink resources of the serving TP.

Figure 1:
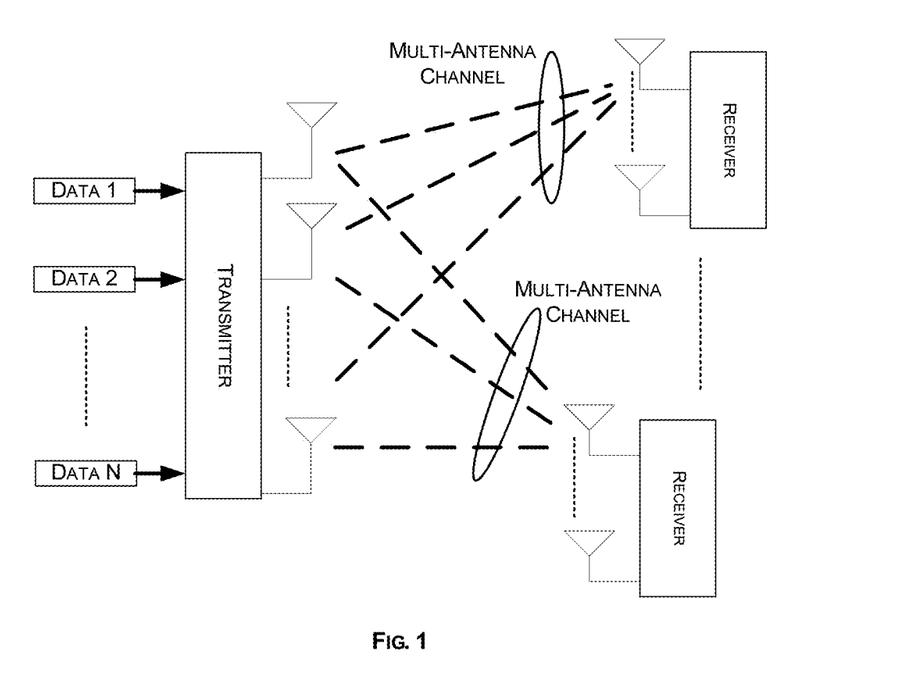
FIG. 1 is a schematic diagram of a MIMO system.

As used herein, the term "MIMO" refers to a wireless transmission technology in which multiple antennas are deployed at both the transmitter and the receiver to make use of spatial resources in wireless transmission and thus achieve spatial multiplex gain and spatial diversity gain. Researches on information theory have shown that the capacity of a MIMO system grows linearly with the minimum of the number of transmitting antennas and the number of receiving antennas. FIG. 1 shows a schematic diagram of a MIMO system. As shown in FIG. 1, a plurality of antennas at the transmitter and the receiver constitute a multi-antenna wireless channel containing spatial domain information.

In addition, the term "information feedback" mainly refers to a process in which a UE feeds back CSI to a TP such that the TP can perform corresponding operations such as radio resource management. There are primarily the following three CSI feedback approaches in the prior art.

Figure 2:
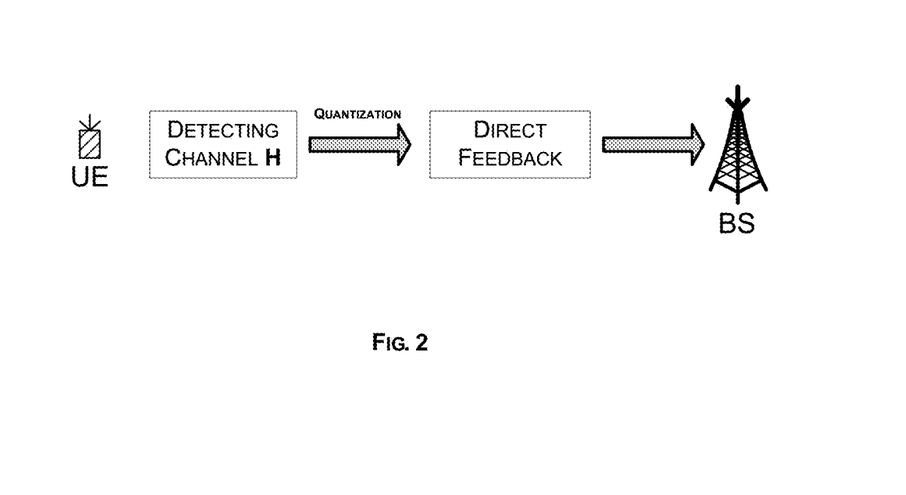
FIG. 2 is a schematic diagram of complete CSI feedback.

Complete CSI Feedback:

The UE quantizes all elements in a transceiver channel matrix and feeds back each of the elements to the TP. Alternatively, the UE can analogously modulate all elements in the transceiver channel matrix and feeds them back to the TP. Alternatively, the UE can obtain a transient covariance matrix for the transceiver channel matrix, quantizes all elements in the covariance matrix and feeds back each of the elements to the TP. Thus, the TP can reconstruct an accurate channel from the channel quantization information fed back from the UE. This approach is described in detail in non-patent document 1: 3GPP R1-093720, "CoMP email summary", Qualcomm and its implementation is illustrated in FIG. 2.

Figure 3:
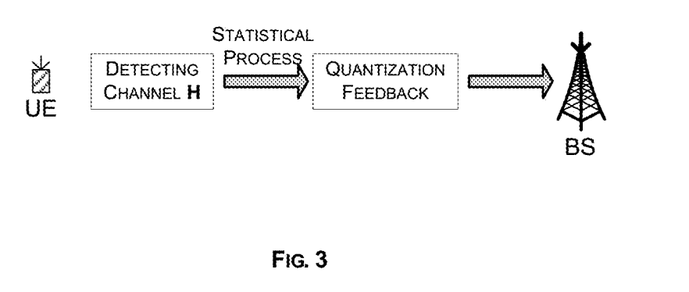
FIG. 3 is a schematic diagram of statistic-based CSI feedback.

Statistic-Based CSI Feedback:

The UE applies a statistical process on a transceiver channel matrix, e.g., calculating a covariance matrix thereof, quantizes the statistical information and then feeds it back to the TP. Thus, the TP can obtain statistical state information of the channel based on the feedback from the UE. This approach is described in detail in non-patent document 1: 3GPP R1-093720, "CoMP email summary", Qualcomm and its implementation is illustrated in FIG. 3.

Figure 4:
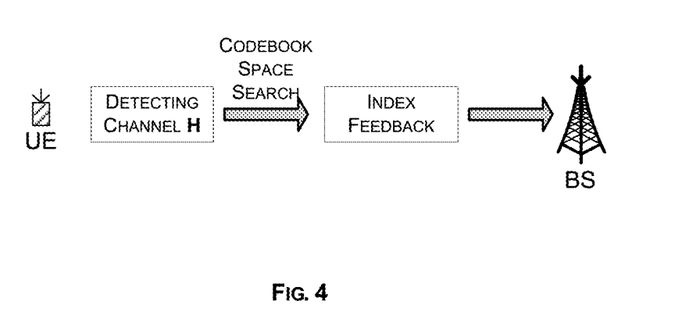
FIG. 4 is a schematic diagram of CSI feedback based on codebook space search.

CSI Feedback Based on Codebook Space Search:

A finite set of CSI (i.e., a codebook space) is predefined by the UE and the TP. Generally, a typical codebook space includes channel rank and/or precoding matrix and/or channel quality indications, etc. Upon detection of a transceiver channel matrix, the UE searches the codebook space for an element best matching the CSI of the current channel matrix and feeds back the index of the element to the TP. Thus, the TP looks up the predefined codebook space based on the index to obtain rough CSI. This approach is described in detail in non-patent document 2: 3GPP, R1-083546, "Per-cell precoding methods for downlink joint processing CoMP", ETRI, and its implementation is illustrated in FIG. 4.

Among the above three approaches, the complete CSI feedback has the best performance, but is difficult to be applied in actual systems due to the highest feedback overhead. In particular, in the coordinated multi-antenna multi-TP system, its feedback overhead grows in proportional to the increase of the number of TPs and it is even more difficult to implement. The CSI feedback based on codebook space search has the lowest feedback overhead, but is worst in terms of performance since it cannot accurately describe the channel state such that the transmitter cannot make full use of channel characteristics to perform transmission accordingly. However, it is extremely simple to implement and can typically accomplish feedback with a few bits. Hence, it is widely applied in actual systems. In comparison, the statistic-based CSI feedback achieves a good trade-off between these two approaches. When the channel state information exhibits remarkable statistical properties, this approach can accurately describe the channel state with a relatively small amount of feedback, thereby achieving a relatively ideal performance.

Currently, in LTE and LTE-A systems, in consideration of factors influencing practical system implementation, the CSI feedback based on codebook space search is employed in the single-cell transmission mode. In the coordinated multi-TP mode of the LTE-A system, it is expected that this CSI feedback based on codebook space search will continue to be used. Therefore, in the following, the present invention will be described with respect to this feedback approach.

For the CSI feedback based on codebook space search, there are two feedback channels in the LTE system, namely, a Physical Uplink Control CHannel (PUCCH) and a Physical Uplink Shared CHannel (PUSCH). In general, the PUCCH is configured for transmission of periodic, basic CSI with low payload; while the PUSCH is configured for transmission of bursty, extended CSI with high payload. On the PUCCH, a complete CSI transmission involves various feedback contents which are transmitted in different sub-frames. On the PUSCH, on the other hand, a complete CSI transmission is carried out within one sub-frame. Such design principles remain applicable in the LTE-A system.

The feedback contents can be divided into three categories: Channel Quality Index (CQI), Precoding Matrix Index (PMI) and Rank Index (RI), all of which are bit quantized feedbacks. The CQI typically corresponds to a transmission format having a packet error rate not more than 0.1.

In the LTE system, the following eight types of MIMO transmission schemes for downlink data are defined:

1) Single antenna transmission, which is used for signal transmission at a single-antenna TP. This scheme is a special instance of a MIMO system and can only transmit a single layer of data.
2) Transmission diversity. In a MIMO system, the effects of time and/or frequency diversities can be utilized for transmitting signals, so as to improve the reception quality of the signals. This scheme can only transmit a single layer of data.
3) Open-loop space division multiplexing, which is a space division multiplexing that does not require PMI feedback from UE.
4) Closed-loop space division multiplexing, which is a space division multiplexing that requires PMI feedback from UE.
5) Multi-user MIMO. Multiple UEs participate in downlink communications of a MIMO system on the same frequency at the same time.
6) Closed-loop single layer precoding, which is enabled by using a MIMO system. Only a single layer of data is transmitted, and PMI feedback from UE is required.
7) Beam forming transmission, which is enabled by using a MIMO system and the beam forming technique. A dedicated reference signal is configured for data demodulation at a UE. Only a single layer of data is transmitted, and PMI feedback from UE is not required.
8) Two-layer beam forming transmission. A UE may or may not be configured to or not to feed back PMI and RI.

In order to support the above MIMO transmission schemes, a variety of CSI feedback modes are defined in the LTE system. Each MIMO transmission scheme corresponds to a number of CSI feedback modes, as detailed in the following.

On the PUCCH, there are four CSI feedback modes applicable, namely, Mode 1-0, Mode 1-1, Mode 2-0 and Mode 2-1. These modes are combinations of four feedback classes, including:

1) Class 1, which relates to a preferred sub-band (SB) location in a Band Part (BP, which is a subset of a set of communication spectrum resources (denoted as Set S) and has a size dependent on the size of the Set S) and CQI(s) for the SB. The respective overheads are L bits for the SB location, 4 bits for the CQI of a first codeword and 3 bits for the CQI of a possible second codeword. The CQI of the second codeword is differentially coded with respect to the CQI of the first codeword.
2) Class 2, which relates to broadband CQI(s) and a PMI. The respective overheads are 4 bits for the CQI of a first codeword, 3 bits for the CQI of a possible second codeword and 1, 2 or 4 bits for the PMI depending on the antenna configuration at the TP. The CQI of the second codeword is differentially coded with respect to the CQI of the first codeword.
3) Class 3, which relates to an RI. The overhead for the RI is 1 bit for two antennas or 2 bits for four antennas, depending on the antenna configuration at the TP.
4) Class 4, which relates to a broadband CQI. The overhead is constantly 4 bits.

In accordance with the above different classes, the UE correspondingly feeds back different information to the TP.

Mode 1-0 is a combination of Class 3 and Class 4. That is, feedbacks in accordance with Class 3 and Class 4 are carried out at respective periods and/or with respective sub-frame offsets. This means the broadband CQI of the first codeword on the Set S and possibly the RI information are fed back.

Mode 1-1 is a combination of Class 3 and Class 2. That is, feedbacks in accordance with Class 3 and Class 2 are carried out at respective periods and/or with respective sub-frame offsets. This means the broadband PMI on the Set S, the broadband CQIs of the individual codewords and possibly the RI information are fed back.

Mode 2-0 is a combination of Class 3, Class 4 and Class 1. That is, feedbacks in accordance with Class 3, Class 4 and Class 1 are carried out at respective periods and/or with respective sub-frame offsets. This means the broadband CQI of the first codeword on the Set S and possibly the RI information, the preferred SB location in the BP and the CQI on the SB are fed back.

Mode 2-1 is a combination of Class 3, Class 2 and Class 1. That is, feedbacks in accordance with Class 3, Class 2 and Class 1 are carried out at respective periods and/or with respective sub-frame offsets. This means the broadband PMI on the Set S, the broadband CQIs of the individual codewords and possibly the RI information, the preferred SB location in the BP and the CQI on the SB are fed back.

Between the MIMO transmission schemes and the CSI feedback modes, there are correspondence relationships as follows:

MIMO transmission scheme 1): Mode 1-0 and Mode 2-0;
MIMO transmission scheme 2): Mode 1-0 and Mode 2-0;
MIMO transmission scheme 3): Mode 1-0 and Mode 2-0;
MIMO transmission scheme 4): Mode 1-1 and Mode 2-1;
MIMO transmission scheme 5): Mode 1-1 and Mode 2-1;
MIMO transmission scheme 6): Mode 1-1 and Mode 2-1;
MIMO transmission scheme 7): Mode 1-0 and Mode 2-0;
MIMO transmission scheme 8): Mode 1-1 and Mode 2-1,
  in case the UE feeds back PMI/RI; or
    Mode 1-0 and Mode 2-0, in case the UE does not feed back PMI/RI.

In the single TP transmission mode of the LTE-A system, CQI, PMI and RI are also the primary feedback contents. Moreover, in order to keep the feedback modes for a UE consistent with those corresponding to the transmission schemes 4) and 8) and to enable new transmission schemes 9) and 10), which are dynamic MIMO switching (wherein the TP can dynamically adjust the MIMO mode in which the UE operates) and CoMP transmission (wherein multiple TPs communicate in a coordinated manner) respectively, in the LTE-A system emphasis is placed on optimizing Mode 1-1 and Mode 2-1 for a scenario where a TP is equipped with 8 transmission antennas. Specifically, a PMI is determined jointly by two channel precoding matrix indices W1 and W2, with W1 indicating broadband/long-term channel characteristics and W2 indicating SB/short-term channel characteristics. For transmitting W1 and W2 over PUCCH, Mode 1-1 is sub-divided into two sub-modes: Mode 1-1 (sub-mode 1) and Mode 1-1 (sub-mode 2). The original Mode 2-1 is also modified.

In order to support the newly defined feedback modes, several feedback classes are newly defined in the LTE-A system as follows:
1) Class 1a, which relates to a preferred SB location in a Band Part (BP, which is a subset of a set of communication spectrum resources (denoted as Set S) and has a size dependent on the size of the Set S) and a CQI on the SB as well as a W2 on another SB. The overhead for the SB location is L bits, and the total overhead for the CQI and the W2 is 8 bits (if RI=1), 9 bits (if 1<RI<5), or 7 bits (if RI>4).
2) Class 2a, which relates to a W1. The overhead for the W1 is 4 bits (if RI<3), 2 bits (if 2<RI<8), or 0 bits (if RI=8).
3) Class 2b, which relates to a broadband W2 and a broadband CQI. The total overhead for the broadband W2 and the broadband CQI is 8 bits (if RI=1), 11 bits (if 1<RI<4), 10 bits (if RI=4), or 7 bits (if RI>4).
4) Class 2c, which relates to a broadband CQI, a W1 and a broadband W2. The total overhead for the broadband CQI, the W1 and the broadband W2 is 8 bits (if RI=1), 11 bits (if 1<RI<4), 9 bits (if RI=4), or 7 bits (if RI>4). It is to be noted that, in order to limit the feedback overhead, the set of values from which the W1 and the broadband W2 can take their values is formed by down-sampling a complete set of all possible values of the W1 and the broadband W2 (namely, the former set of values is a subset of the latter set of values).
5) Class 5, which relates to an RI and a W1. The total overhead for the RI and the WI is 4 bits (for 8 antennas and 2-layer data multiplexing) or 5 bits (for 8 antennas and 4/8-layer data multiplexing). Also, it is to be noted that, in order to limit the feedback overhead, the set of values from which the W1 can take its value is formed by down-sampling a complete set of all possible values of the W1.
6) Class 6, which relates to an RI and a Precoding Type Indicator (PTI). The overhead for the PTI is 1 bit, indicating the type of precoding. The total overhead for the RI and the PTI is 2 bits (for 8 antennas and 2-layer data multiplexing), 3 bits (for 8 antennas and 3-layer data multiplexing), or 4 bits (for 8 antennas and 8-layer data multiplexing).

Here, "W1" and "W2" when used alone refer to "broadband W1" and "broadband W2" respectively, while "SB W2" is referred to by its full name.

The mode-class relationships between Mode 1-1 (sub-mode 1), Mode 1-1 (sub-mode 2) and Mode 2-1 and the original and the above new feedback classes are as follows:

Mode 1-1 (sub-mode 1) is a combination of Class 5 and Class 2b. That is, feedbacks in accordance with Class 5 and Class 2b are carried out at respective periods and/or with respective sub-frame offsets.

Mode 1-1 (sub-mode 2) is a combination of Class 3 and Class 2/2c,
  when the MIMO transmission scheme is of type 4) or 8), Mode 1-1 (sub-mode 2) is composed of Class 3 and Class 2. That is, feedbacks in accordance with Class 3 and Class 2 are carried out at respective periods and/or with respective sub-frame offsets.
  when the MIMO transmission scheme is of type 9) or 10), Mode 1-1 (sub-mode 2) is composed of Class 3 and Class 2c. That is, feedbacks in accordance with Class 3 and Class 2c are carried out at respective periods and/or with respective sub-frame offsets.

the new Mode 2-1 is specific to the MIMO transmission scheme of type 9) or 10), and is a combination of Class 6, Class 2b and Class 2a/1a,
  when the PTI related to Class 6 is 0, the new Mode 2-1 is composed of Class 6, Class 2b and Class 2a. That is, feedbacks in accordance with Class 6, Class 2b and Class 2a are carried out at respective periods and/or with respective sub-frame offsets.

when the PTI related to Class 6 is 1, the new Mode 2-1 is composed of Class 6, Class 2b and Class 1a. That is, feedbacks in accordance with Class 6, Class 2b and Class 1a are carried out at respective periods and/or with respective sub-frame offsets.

Further, it is to be noted that the TSG-RAN WG1 meeting #71 was held in New Orleans, United States, in November 2012. According to the minutes of the meeting, a CSI process is defined to be determined by a CSI reference signal resource (CSI-RS-R) and an interference measurement resource (IMR). That is, the signal portion of the CSI process is determined by a measurement for the CSI-RS-R and the interference portion of the CSI process is determined by a measurement for the IMR. In the CoMP transmission, a TP configures multiple CSI processes for a UE, and the RI of a CSI process may be configured to be the same as the RI of another CSI process. Specifically, a CSI process is defined as an RI reference process, and the TP may configure another RI dependent CSI process to inherit the RI of the RI reference process and have it reported so as to facilitate the CoMP transmission. In particular, in the new Mode 2-1, both the RI and the PTI of the RI reference process are inherited by the RI dependent process. In the new Mode 1-1 (sub-mode 1), because the RI and the W1 are reported at the same time, both the RI and W1 of the RI reference process are inherited by the RI dependent process if the RI reference process and the RI dependent process have their RI and W1 reported at the same time, and only the RI of the RI reference process is inherited by the RI dependent process if the RI reference process and the RI dependent process have their RI and W1 reported at different times. It is to be noted that, in order to ensure that the inheritance is practicable, the feedback mode and the number of antenna ports for the RI dependent process must be the same as those for the RI reference process.

The RI inheritance is mainly used to effect non-coherent JT and frequency domain DPS/DPB operations, because in the LTE and LTE-A systems the RI for a data transmission of a UE shall remain constant in frequency domain (see 3GPP RI-124625, "Rank and Subband Inheritance between CSI Processes", Ericsson).

In the enhanced 4G system of the future, it is necessary to make researches on transmission schemes such as non-coherent JT to develop for example new CSI feedback designs, TP selection algorithms, precoding and power allocation algorithms and the like. Among these, relative CSI between TPs (such as information of a relative phase between TPs) or aggregated CQI for TPs are important feedback contents for supporting non-coherent JT transmission (see 3GPP R1-121349, "Comparison between inter-CSI-RS co-phase and aggregated CQI", SHARP). Besides, in order to support non-coherent JT better, the frequency domain SB inheritance needs to be considered, so that signals from multiple TPs can be superposed coherently at the same frequency.

Therefore, in the enhanced 4G system of the future, how to design a feedback method compatible with existing mechanisms to support various CoMP transmissions is an important research topic.

SUMMARY

Due to the lack of a CSI feedback method supporting transmission schemes such as JT transmission in the prior art, it is an object of the present disclosure to provide a novel CSI feedback method and a UE in which the method is implemented to fill this gap.

To achieve the above object, according to a first aspect of the present disclosure, there is provided a method in a UE for feeding back CSI. The method comprises: acquiring a set of CSI processes which are configured by a TP to participate in multi-antenna multi-TP coordination; acquiring an SB inheritance which is configured by a TP for a CSI process from the set of CSI processes; calculating the CSI based on the configuration for the CSI process; and feeding the calculated CSI back to a TP.

Preferably, the method according to the first aspect further comprises acquiring an RI inheritance which is configured by a TP for a CSI process from the set of CSI processes.

Preferably, if a CSI process is configured as an SB dependent process, it inherits its SB from an SB reference process. If a CSI process is configured as an RI dependent process, it inherits its RI from an RI reference process.

Preferably, for a CSI process which supports non-CoMP transmission, no inheritance is configured. For a CSI process which supports non-coherent JT and frequency-domain DPS/DPB transmission, an RI inheritance is configured and no SB inheritance is configured. For a CSI process which supports independent multi-point transmissions, no RI inheritance is configured and an SB inheritance is configured. Additionally or alternatively, for a CSI process which supports coherent JT transmission, an RI inheritance and an SB inheritance are configured.

Preferably, if an SB reference process and an SB dependent process need to have their SB information and other CSI reported at the same time, the UE only calculates and reports CSI information related to the SB reference process.

Preferably, if an SB reference process and an SB dependent process need to have their SB information and other CSI reported at different times, information to be reported which is related to the SB dependent process is calculated based on SB information resulting from the latest inheritance.

Preferably, an SB is calculated and selected for an SB reference process, based on the assumption that the SB reference process and its related SB dependent process operate for JT transmission.

Preferably, for a CSI process which is configured as an SB dependent process and not as an RI dependent process, a new feedback class 1a of a new mode 2-1 is formed, according to which an SB location inherited from an SB reference process is not fed back.

Preferably, a CQI is fed back which is generated after the UE performs interference cancellation, wherein the UE performs the interference cancellation in an order which is fixed or configured for the UE by a TP via radio resource control (RRC) or media access control (MAC) signaling.

Optionally, a number of SB CQIs of the SB dependent process is different from a number of SB CQIs of the SB reference process.

Preferably, for a CSI process which is configured as an SB dependent process and RI reference process, a new feedback class 1a of a new mode 2-1 is formed, according to which an SB location inherited from an SB reference process is or is not fed back.

Optionally, according to the new class 1a, an SB location, an SB W2 and an SB CQI are fed back, wherein the SB location is the same as that of the SB reference process.

Optionally, according to the new class 1a, an SB location, an SB W2 and an aggregated CQI are fed back, wherein the SB location is the same as that of the SB reference process.

Optionally, according to the new class 1a, only an SB W2 and an SB CQI are fed back, wherein an SB location of the CSI process is the same as that of the SB reference process and does not need to be fed back.

Optionally, according to the new class 1a, an SB W2, information of a relative phase between the SB dependent process and the SB reference process and an aggregated CQI are fed back, wherein an SB location of the CSI process is the same as that of the SB reference process and does not need to be fed back.

Optionally, according to the new class 1a, an SB W2, information of a relative phase between the SB dependent process and the SB reference process and an SB CQI are fed back, wherein an SB location of the CSI process is the same as that of the SB reference process and does not need to be fed back.

Optionally, according to the new class 1a, an SB W2, an SB CQI and an aggregated CQI are fed back, wherein an SB location of the CSI process is the same as that of the SB reference process and does not need to be fed back. Preferably, the aggregated CQI and the SB CQI are coded differentially.

Optionally, according to the new class 1a, an SB W2 and an aggregated CQI are fed back, wherein an SB location of the CSI process is the same as that of the SB reference process and does not need to be fed back.

Optionally, according to the new class 1a, an enhanced SB W2 and an aggregated CQI are fed back, wherein an SB location of the CSI process is the same as that of the SB reference process and does not need to be fed back.

Optionally, according to the new class 1a, an enhanced SB W2 and an SB CQI are fed back, wherein an SB location of the CSI process is the same as that of the SB reference process and does not need to be fed back.

Optionally, the new class 1a is predefined, or selected by a TP from a subset of multiple formats and then configured for the UE via RRC or MAC signaling.

Optionally, the information of the relative phase refers to one or more phase values.

Optionally, the aggregated CQI contains a plurality of CQI values to support JT transmission of multiple data flows.

Optionally, the aggregated CQI is calculated, based on the assumption that the SB reference process and the SB dependent process operate for JT transmission.

According to a second aspect of the disclosure, there is provided a UE. The UE comprises a CSI process set acquiring unit, an inheritance configuration acquiring unit, a CSI calculating unit and a CSI feedback unit. The CSI process set acquiring unit is configured to acquire a set of CSI processes which are configured by a TP to participate in multi-antenna multi-TP coordination. The inheritance configuration acquiring unit is configured to acquire an SB inheritance which is configured by a TP for a CSI process from the set of CSI processes. The CSI calculating unit is configured to calculate CSI based on the configuration for the CSI process. The CSI feedback unit is configured to feed the calculated CSI back to a TP.

Preferably, the inheritance configuration acquiring unit further acquires an RI inheritance which is configured by a TP for a CSI process from the set of CSI processes.

Preferably, if an SB reference process and an SB dependent process need to have their SB information and other CSI reported at the same time, the CSI calculating unit only calculates CSI information related to the SB reference process.

Preferably, if an SB reference process and an SB dependent process need to have their SB information and other CSI reported at different times, the CSI calculating unit calculates, based on SB information resulting from the latest inheritance, information to be reported which is related to the SB dependent process.

Preferably, the CSI calculating unit calculates and selects an SB for an SB reference process based on the assumption that the SB reference process and its related SB dependent process operate for JT transmission.

Preferably, for a CSI process which is configured as an SB dependent process and not as an RI dependent process, the CSI feedback unit performs feedback in accordance with a new feedback class 1a of a new mode 2-1, according to which an SB location inherited from an SB reference process is not fed back.

Preferably, for a CSI process which is configured as an SB dependent process and RI reference process, the CSI feedback unit performs feedback in accordance with a new feedback class 1a of a new mode 2-1, according to which an SB location inherited from an SB reference process is or is not fed back.

Preferably, the CSI calculating unit calculates an aggregated CQI based on the assumption that the SB reference process and the SB dependent process operate for JT transmission.

The CSI feedback method and the UE according to the present disclosure have the advantages of high system throughput, simple implementation and low signaling overhead.

BRIEF DESCRIPTION OF THE DRAWINGS

The above and other objects, features and advantages of the present disclosure will be more apparent from the following preferred embodiments described with reference to accompanying drawings, in which.

DETAILED DESCRIPTION

In the following, preferred embodiments of the present disclosure will be described in detail with reference to the drawings. In the description, details and functions unnecessary to the present disclosure are omitted so as not to obscure the concept of the disclosure.

For clear and detailed explanation of the implementation steps of the present disclosure, some specific embodiments applicable to the LTE-A cellular communication system in downlink are given below. It is to be noted that the present disclosure is not limited to the application exemplified in the embodiments. Rather, it is applicable to other communication systems, such as the future 5G system. Accordingly, terms as used herein to refer to feedback modes and feedback classes may change with the communication system to which the invention is applied.

Figure 5:
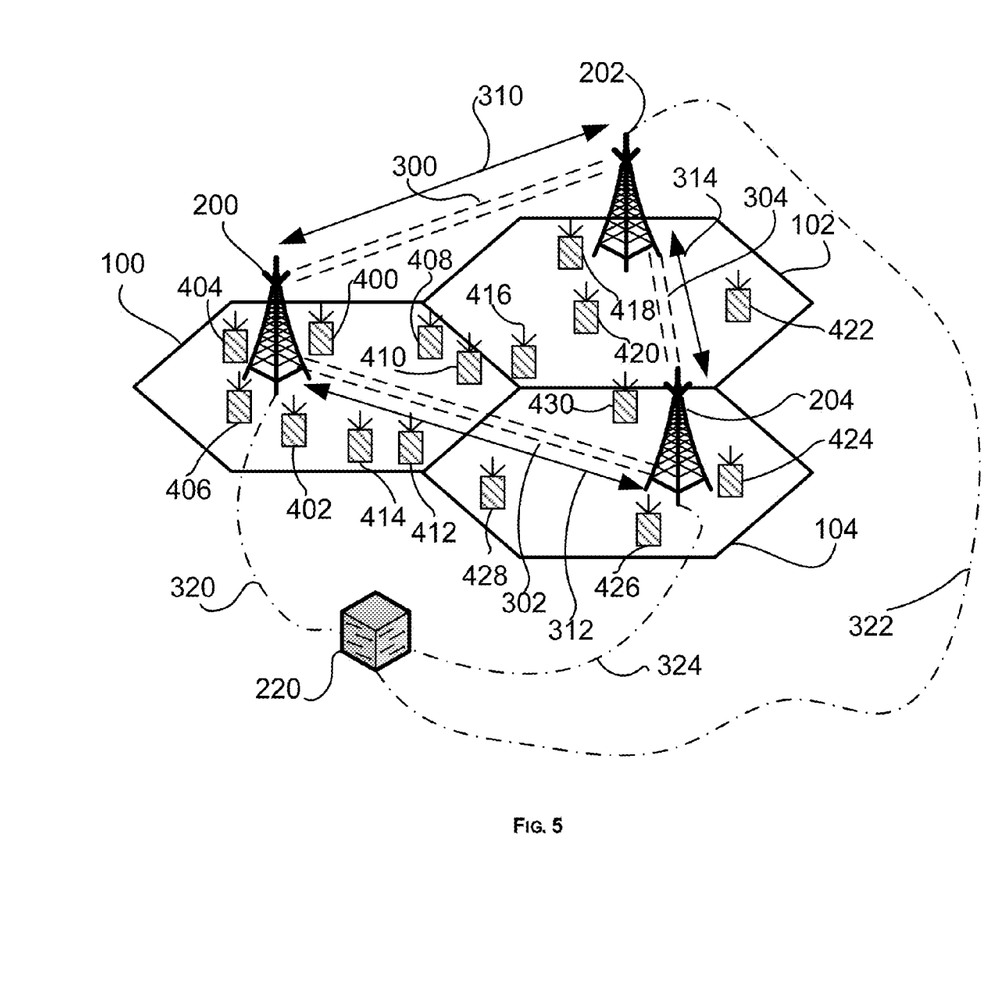
FIG. 5 is a schematic diagram of a multi-cell cellular communication system.

FIG. 5 is a schematic diagram of a multi-cell cellular communication system. The cellular system has a service coverage area divided into a number of adjacent wireless coverage areas, i.e., cells. In FIG. 5, the entire service area is formed by contiguous cells 100-104, each being illustratively shown as a hexagon. TPs 200-204 are associated with the cells 100-104, respectively. As well known in the art, each of the TPs 200-204 comprises at least a transmitter and a receiver. It is to be noted that a TP, which in a basic form equals a serving node in a cell, may also be an independent BS capable of resource scheduling, a transmitting node subordinate to an independent BS, a relay node (which is typically deployed for extending the coverage of a cell), or the like. Also, as mentioned above in the background and will be described in the following examples, a TP may be any appropriate combination of ports of the above-described serving node. As illustratively shown in FIG. 5, each of the TPs 200-204 is located in a certain area of a respective one of the cells 100-104 and is equipped with an omni-directional antenna. However, in a cell arrangement for the cellular communication system, each of the TPs 200-204 may be equipped with a directional antenna for directionally covering a partial area (which is commonly referred to as a sector) of a respective one of the cells 100-104. Thus, the diagram of the multi-cell cellular communication system as shown in FIG. 5 is for illustrative purpose only and does not imply that the implementation of the cellular system according to the present disclosure is limited by the above particular constraints.

As shown in FIG. 5, the TPs 200-204 are connected with each other via X2 interfaces 300-304. In an LTE-A system, a three-layer node network architecture including TPs, radio network control units and a core network is reduced into a two-layer node architecture, in which the function of radio network control units is distributed over TPs and TPs coordinate and communicate with each other via wired interfaces named "X2".

In FIG. 5, the TPs 200-204 are also connected with each other via air interfaces, A1 interfaces, 310-314. In future communication systems, it is possible to introduce a concept of relay node. Relay nodes are connected with each other via wireless interfaces and a TP can be considered as a special kind of relay node. Thus, in the future, there may be wireless interfaces named "A1" between TPs for coordination and communications between the TPs.

Additionally, an upper layer entity 220 of the TPs 200-204 is also shown in FIG. 5, which can be a gateway or another network entity such as a mobility management entity. The upper layer entity 220 is connected to the TPs 200-204 via S1 interfaces 320-324, respectively. In an LTE-A system, the upper layer entity and TPs coordinate and communicate with each other via wired interfaces named "S1".

A number of UEs (UEs) 400-430 are distributed over the cells 100-104, as shown in FIG. 5. As well known in the art, each of the UEs 400-430 comprises a transmitter, a receiver and a mobile terminal control unit. Each of the UEs accesses the cellular communication system via its respective serving TP (one of the TPs 200-204). It should be understood that while only 16 UEs are illustratively shown in FIG. 5, there may be a considerable number of UEs in practice. In this sense, the depiction of the UEs in FIG. 5 is also for illustrative purpose only. Each of the UEs 400-430 accesses the cellular communication network via its respective serving TP, which is one of TPs 200-204 that serves it. A TP providing communication services directly to a certain UE is referred to as a serving TP for that UE, while other TPs are referred to non-serving TPs for that UE. A non-serving TP may function as a cooperating TP which cooperates with the serving TP to provide communication services to the UE.

For explanation of embodiments of the present disclosure, UE 416 is considered. The UE 416 operates in a multi-TP coordination mode, has TP 202 as its serving TP and has TPs 200 and 204 as its non-serving TPs. It is to be noted that, although focus is placed on UE 416, this does not imply that the present disclosure is only applicable to one-UE scenario. Rather, the present disclosure works well for multi-UE scenario. For example, the inventive method may be used by UE 408, 410, 430 or the like shown in FIG. 5. Although in the implementing scenario one serving TP and two non-serving TPs are involved, this by no means implies that the present disclosure is limited by such constraints. Rather, serving and non-serving TPs are not limited in their numbers.

Figure 6:
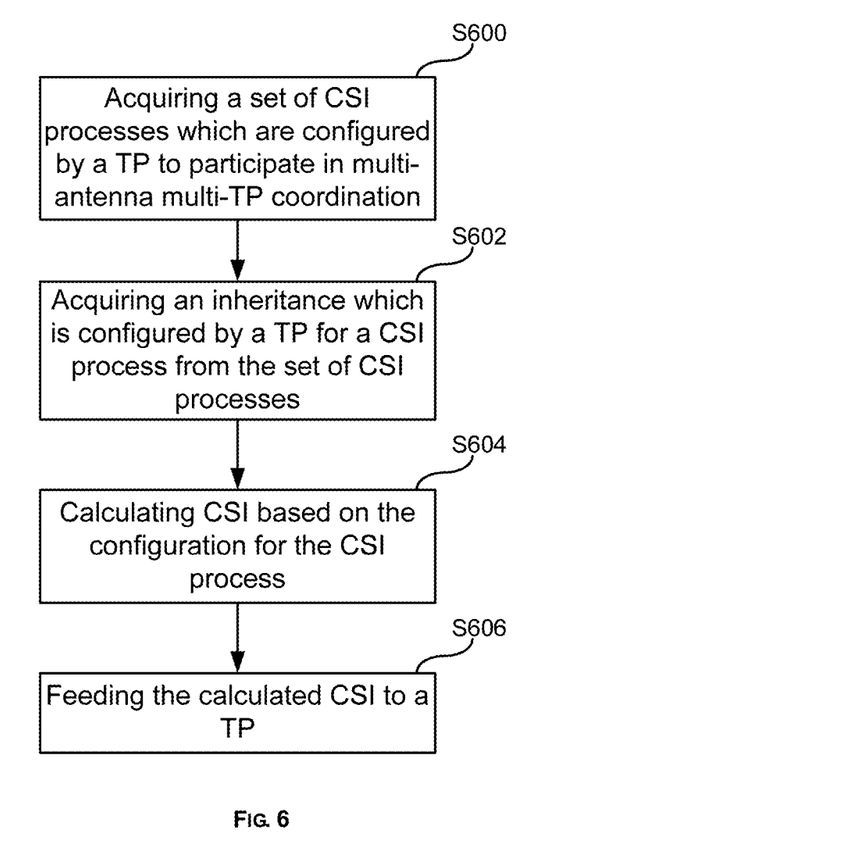
FIG. 6 is a flowchart illustrating a method according to the present disclosure.

In the following, the inventive method according to the present disclosure will be described with reference to FIG. 6. For explanation of embodiments according to the present disclosure, the following multi-TP coordination scenario is assumed:

UE 416, which is under consideration, operates in a multi-TP coordination mode, has TP 202 as its serving BS and has TPs 200 and 204 as its non-serving TPs. The UE 416 may be a single-antenna or multi-antenna device.

At step S600, the UE acquires a set of CSI processes which are configured by a TP to participate in multi-antenna multi-TP coordination.

In this step, the UE typically first acquires, from the serving TP or some other TP, the set of CSI processes which participate in the multi-antenna multi-TP coordination. As a non-limiting implementation of this step, the UE (e.g., UE 416) may periodically report to the serving TP (e.g., serving TP 202) path loss information of paths from the UE to its adjacent TPs. Accordingly, the serving TP may estimate the geographic location of the UE from the report, then determine the set of CSI processes participating in the multi-antenna multi-TP coordination based on the estimated geographic location, and semi-statically configure the set of CSI processes for the UE via upper layer signaling, such as Radio Resource Control (RRC) signaling, or Media Access Control (MAC) layer signaling. In the following, 3 non-limiting examples of the set of CSI processes will be given for cases where the set of CSI processes include two or three CSI processes.

Example 1(a)

The set of CSI processes which are configured by the serving TP 202 for the UE 416 include 2 CSI processes: (1) CSI process #1, determined by CSI-RS-R on a total of eight ports (including ports #0-#7) of TP 202 and IMR on which signal strength not from TP 202 is measured, and (2) CSI process #2, determined by CSI-RS-R on a total of eight ports (including ports #0-#7) of TP 200 and IMR on which signal strength not from TP 200 is measured.

Example 1(b)

The set of CSI processes which are configured by the serving TP 202 for the UE 416 include 3 CSI processes: (1) CSI process #1, determined by CSI-RS-R on a total of eight ports (including ports #0-#7) of TP 202 and IMR on which signal strength not from TP 202 is measured, (2) CSI process

2, determined by CSI-RS-R on a total of eight ports (including ports #0-#7) of TP 200 and IMR on which signal strength not from TP 200 is measured, and (3) CSI process #3, determined by CSI-RS-R on a total of eight ports (including ports #0-#7) of TP 204 and IMR on which signal strength not from TP 204 is measured.

Example 1(c)

The set of CSI processes which are configured by the serving TP 202 for the UE 416 include 3 CSI processes: (1) CSI process #1, determined by CSI-RS-R on a total of eight ports (including ports #0-#7) of TP 202 and IMR on which signal strength not from TP 202 is measured, (2) CSI process #2, determined by CSI-RS-R on a total of eight ports (including ports #0-#7) of TP 200 and IMR on which signal strength not from TP 200 is measured, and (3) CSI process #3, determined by a total of eight ports (including ports #0-#7) of TP 200 and IMR on which signal strength not from TP 200 and TP 202 is measured.

At step S602, the UE acquires an SB inheritance and possibly an RI inheritance which are configured by a TP for a CSI process from the set of CSI processes.

In this step, the UE acquires the SB inheritance and possibly the RI inheritance which are configured by the serving TP or some other TP via RRC or MAC signaling for each of the set of CSI processes for the UE.

Preferably, the SB of a CSI process may be configured to be consistent with the SB of another CSI process. Specifically, a CSI process is defined as an SB reference process, and other SB dependent CSI processes may be configured by the TP to inherit their SBs from the SB reference process.

Preferably, a CSI process, for which no inheritance is configured, is mainly used to support non-CoMP transmission.

Preferably, a CSI process, for which an RI inheritance is configured and no SB inheritance is configured, is mainly used to support non-coherent JT and frequency-domain DPS/DPB transmission.

Preferably, a CSI process, for which no RI inheritance is configured and an SB inheritance is configured, is mainly used to support independent multi-point transmissions. It is to be noted that independent multi-point transmissions is a CoMP transmission scheme, in which multiple TPs transmit different data and a UE demodulates superposed data packets by means of an advanced receiver. Such a scheme may increase data throughput for a single user.

Preferably, a CSI process, for which both an RI inheritance and an SB inheritance are configured, is mainly used to support coherent JT transmission.

In the following, 4 non-limiting examples of configuring RI and SB inheritances will are given for cases where the set of CSI processes include two or three CSI processes.

Example 2(a)

The set of CSI processes which are configured by the serving TP 202 for the UE 416 include 2 CSI processes which are CSI process #1 and CSI process #2. For CSI process #1, no inheritance is configured. For CSI process #2, an RI inheritance from CSI process #1 is configured. Thus, CSI process #1 becomes an RI reference process of CSI process #2, and CSI process #2 becomes an RI dependent process of CSI process #1.

Example 2(b)

The set of CSI processes which are configured by the serving TP 202 for the UE 416 include 3 CSI processes which are CSI process #1, CSI process #2 and CSI process #3. For CSI process #1, no inheritance is configured. For CSI process #2, an RI inheritance and an SB inheritance from CSI process #1 are configured. Thus, CSI process #1 becomes an RI reference process and SB reference process of CSI process #2, and CSI process #2 becomes an RI dependent process and SB dependent process of CSI process #1. For CSI process #3, an RI inheritance and an SB inheritance from CSI process #1 are configured. Thus, CSI process #1 becomes an RI reference process and SB reference process of CSI process #3, and CSI process #3 becomes an RI dependent process and SB dependent process of CSI process #1.

Example 2(c)

The set of CSI processes which are configured by the serving TP 202 for the UE 416 include 3 CSI processes which are CSI process #1, CSI process #2 and CSI process #3. For CSI process #1, no inheritance is configured. For CSI process #2, an RI inheritance and an SB inheritance from CSI process #1 are configured. Thus, CSI process #1 becomes an RI reference process and SB reference process of CSI process #2, and CSI process #2 becomes an RI dependent process and SB dependent process of CSI process #1. For CSI process #3, an SB inheritance from CSI process #1 is configured. Thus, CSI process #1 becomes an SB reference process of CSI process #3, and CSI process #3 becomes an SB dependent process of CSI process #1.

Example 2(d)

The set of CSI processes which are configured by the serving TP 202 for the UE 416 include 3 CSI processes which are CSI process #1, CSI process #2 and CSI process #3. For CSI process #1, no inheritance is configured. For CSI process #2, no inheritance is configured. For CSI process #3, an SB inheritance from CSI process #2 is configured. Thus, CSI process #2 becomes an SB reference process of CSI process #3, and CSI process #3 becomes an SB dependent process of CSI process #2.

At step S604, the UE calculates CSI based on the configuration for the CSI process.

Preferably, in a new feedback mode 2-1, if an SB reference process and an SB dependent process need to have their SB information and other CSI reported at the same time, the UE only calculates and reports CSI information related to the SB reference process.

Preferably, in a new feedback mode 2-1, if an SB reference process and an SB dependent process need to have their SB information and other CSI reported at different times, information to be reported which is related to the SB dependent process is calculated based on SB information resulting from the latest inheritance.

Preferably, in a new feedback mode 2-1, an SB is calculated and selected for an SB reference process, based on the assumption that the SB reference process and its related SB dependent process operate for JT transmission.

At step 606, the UE feeds the CSI back to a TP.

In the following, several exemplary designs of feedback modes of the CSI are described in detail.

Example 3(a)

The set of CSI processes configured for UE 416 include 2 CSI processes which are CSI process #1 and CSI process #2. For CSI process #1, no inheritance is configured. For CSI process #2, an SB inheritance from CSI process #1 is configured. Thus, CSI process #1 becomes an SB reference process of CSI process #2, and CSI process #2 becomes an SB dependent process of CSI process #1. For CSI process #1, feedback modes for existing systems are used without modification. For CSI process #2, the following feedback modes are proposed:

Since no RI inheritance is configured, feedback class 6 is unchanged.
Branch (1): PTI=0, class 2a and class 2b are considered.
Since no RI inheritance is configured, feedback classes 2a and 2b are unchanged.
Branch (2): PTI=1, class 2b and class 1a are considered.
Since no RI inheritance is configured, feedback class 2b is unchanged.

For a new mode 2-1, its third part is class 1a. Since CSI process #2 inherits its SB location from CSI process #1, the SB location may not be fed back. Thus, a new class 1a is formed. Besides, its SB CQI shall be generated after the UE performs interference cancellation. It is to be noted that the order in which the UE performs the interference cancellation may be fixed (for example, an SB reference process take priority over an SB dependent process) or configured by a TP via RRC or MAC signaling. Also, it is to be noted that, since no RI inheritance is configured, the number of SB CQIs of CSI process #2 may be different from the number of SB CQIs of CSI process #1.

Example 3(b)

The set of CSI processes configured for UE 416 include 3 CSI processes which are CSI process #1, CSI process #2 and CSI process #3. For CSI process #1, no inheritance is configured. For CSI process #2, an RI inheritance and an SB inheritance from CSI process #1 are configured. For CSI process #3, an RI inheritance and an SB inheritance from CSI process #2 are configured as well. For CSI process #1, feedback modes for existing systems are used without modification. For CSI process #2/#3, the following feedback modes are proposed:

Since the RI inheritance is configured, the existing design for feedback class 6 continues to be used. That is, RI and PTI of CSI process #1 are inherited by CSI process #2/#3.
Branch (1): PTI=0, class 2a and class 2b are considered.
Since the SB inheritance is not involved, feedback classes 2a and 2b are unchanged.
Branch (2): PTI=1, class 2b and class 1a are considered.
Since the SB inheritance is not involved, feedback class 2b is unchanged.

For a new mode 2-1, its third part is class 1a. Since CSI process #2/#3 inherits its SB location from CSI process #1, the SB location may or may not be fed back. Thus, a new class 1a is formed to support JT transmission.

Figure 8:
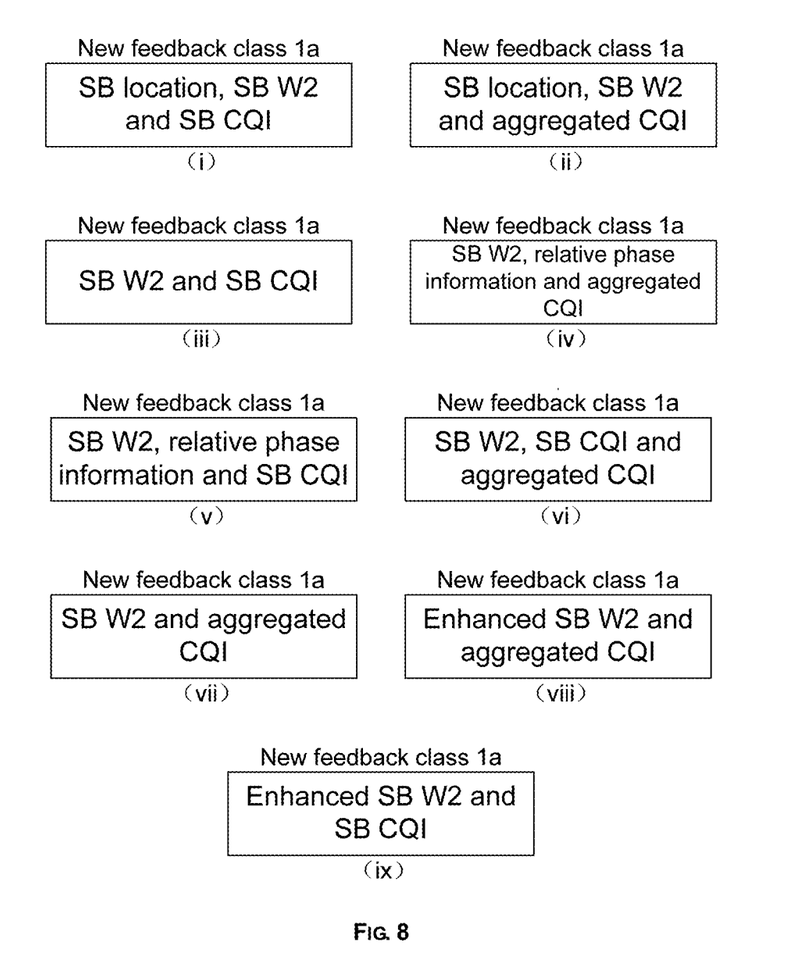
FIG. 8 is a schematic diagram illustrating nine possible feedback formats of class 1a according to the present disclosure.

There are 9 designs for the new class 1a as follows:
(i) As is the existing design for class 1a, an SB location, an SB W2 and an SB CQI are fed back according to the new class 1a, with the SB location being the same as the SB location of CSI process #1.
(ii) According to the new class 1a, an SB location, an SB W2 and an aggregated CQI are fed back, with the SB location being the same as the SB location of CSI process #1.
(iii) According to the new class 1a, only an SB W2 and an SB CQI are fed back. The SB location of CSI process #2/#3 is the same as the SB location of CSI process #1 and does not need to be fed back.

(iv) According to the new class 1a, an SB W2, information of a relative phase between CSI process #2/#3 and the CSI process #1 and an aggregated CQI are fed back. The SB location of CSI process #2/#3 is the same as the SB location of CSI process #1 and does not need to be fed back.
(v) According to the new class 1a, an SB W2, information of a relative phase between CSI process #2/#3 and the CSI process #1 and an SB CQI are fed back. The SB location of CSI process #2/#3 is the same as the SB location of CSI process #1 and does not need to be fed back.
(vi) According to the new class 1a, an SB W2, an SB CQI and an aggregated CQI are fed back. The SB location of CSI process #2/#3 is the same as the SB location of CSI process #1 and does not need to be fed back. In order to reduce overhead for feedback, the aggregated CQI and the SB CQI may be coded differentially. That is, an actual aggregated CQI from which the SB CQI is subtracted is fed back as the aggregated CQI.
(vii) According to the new class 1a, an SB W2 and an aggregated CQI are fed back. The SB location of CSI process #2/#3 is the same as the SB location of CSI process #1 and does not need to be fed back.
(viii) According to the new class 1a, an enhanced SB W2 and an aggregated CQI are fed back. The SB location of CSI process #2/#3 is the same as the SB location of CSI process #1 and does not need to be fed back. The enhanced SB W2 refers to an SB W2 quantized more actually.
(ix) According to the new class 1a, an enhanced SB W2 and an SB CQI are fed back. The SB location of CSI process #2/#3 is the same as the SB location of CSI process #1 and does not need to be fed back. The enhanced SB W2 refers to an SB W2 quantized more actually.

FIG. 8 illustrates the above 9 designs in detail. One of the above 9 designs may be selected as the new class 1a. Alternatively, one of a subset of the above 9 designs may be configured by a TP via RRC or MAC signalling as the new class 1a for the UE. For example, designs (i), (ii) and (iii) may be the subset of designs for UE 416, and design (ii) is configured by TP 202 via RRC signalling the new class 1a for UE 416.

It is to be noted that the information of the relative phase may refer to one or more phase values. Also, it is to be noted that the aggregated CQI may contain a plurality of CQI values to support JT transmission. The aggregated CQI is calculated based on the assumption that CSI process #1 and CSI process #2/#3 operate for JT transmission.

Note that due to limitations on space the above examples merely illustrate feedback schemes for cases where the set of coordinated TPs include two or three TPs. However, benefiting from the teachings of the present disclosure, those skilled in the art can readily apply the above feedback schemes to cases where the set of coordinated TPs include more TPs.

Figure 7:
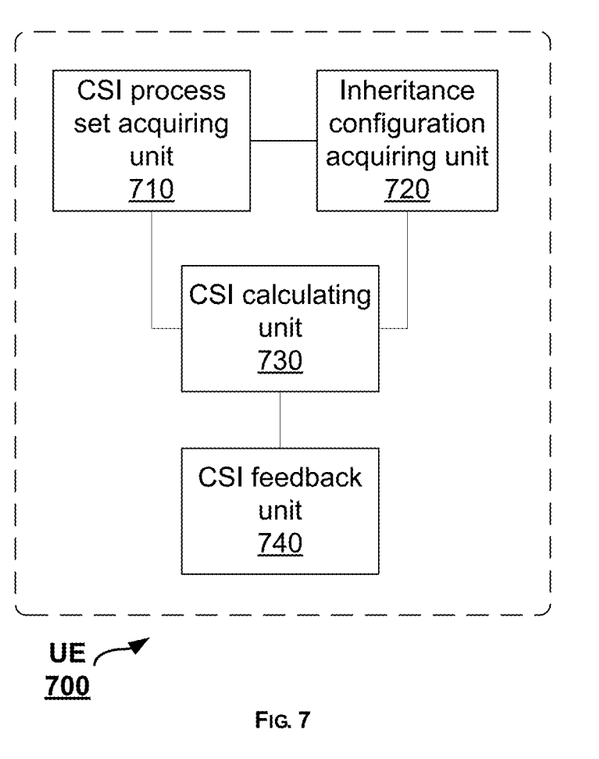
FIG. 7 is a schematic block diagram illustrating a structure of a user equipment according to the present disclosure.

To implement the above-described CSI feedback, the present disclosure also provides a UE 700. FIG. 7 is a schematic block diagram illustrating a structure of the UE 700.

As shown in FIG. 7, the UE 700 according to the present disclosure comprises a CSI process set acquiring unit 710, an RI and SB inheritance configuration acquiring unit 720, a CSI calculating unit 730 and a CSI feedback unit 740. The CSI process set acquiring unit 710 is configured to acquire a set of CSI processes which are configured by a TP to participate in multi-antenna multi-TP coordination. The RI and SB inheritance configuration acquiring unit 720 is configured to acquire an SB inheritance which is configured by a TP for a CSI process from the set of CSI processes. The CSI calculating unit 730 is configured to calculate CSI based on the configuration for the CSI process. The CSI feedback unit 740 is configured to feed the calculated CSI back to a TP.

Preferably, the inheritance configuration acquiring unit 720 further acquires an RI inheritance which is configured by a TP for a CSI process from the set of CSI processes.

Preferably, if an SB reference process and an SB dependent process need to have their SB information and other CSI reported at the same time, the CSI calculating unit 730 only calculates CSI information related to the SB reference process.

Preferably, if an SB reference process and an SB dependent process need to have their SB information and other CSI reported at different times, the CSI calculating unit 730 calculates, based on SB information resulting from the latest inheritance, information to be reported which is related to the SB dependent process.

Preferably, the CSI calculating unit 730 calculates and selects an SB for an SB reference process based on the assumption that the SB reference process and its related SB dependent process operate for JT transmission.

Preferably, for a CSI process which is configured as an SB dependent process and not as an RI dependent process, the CSI feedback unit 740 performs feedback in accordance with a new feedback class 1a of a new mode 2-1, according to which an SB location inherited from an SB reference process is not fed back.

Preferably, for a CSI process which is configured as an SB dependent process and RI reference process, the CSI feedback unit 740 performs feedback in accordance with a new feedback class 1a of a new mode 2-1, according to which an SB location inherited from an SB reference process is or is not fed back.

Preferably, the CSI calculating unit 730 calculates an aggregated CQI based on the assumption that the SB reference process and the SB dependent process operate for JT transmission.

It should be noted that solutions according to the present disclosure have been described above by a way of example only. However, the present disclosure is not intended to be limited to the above-described steps and element structures. Instead, when appropriate, the steps and elements structures may be adapted or omitted as required. Thus, some of the steps and elements are not essential for embodying the general inventive concept of the present disclosure. Therefore, essential features of the present disclosure are only limited to those required for embodying the general inventive concept of the present disclosure and are not limited by the above specific examples.

In the foregoing, the present disclosure has been described with reference to preferred embodiments thereof. It should be understood that various modifications, alternations and additions can be made by those skilled in the art without departing from the spirits and scope of the present disclosure. Therefore, the scope of the present disclosure is not limited to the above specific embodiments but shall be defined by the claims as attached.

The invention claimed is:

1. A method in a user equipment (UE) for feeding back channel state information (CSI), comprising:
   acquiring a set of CSI processes which are configured by a transmission point (TP);
   acquiring a sub-band (SB) inheritance which is configured by a TP for a CSI process from the set of CSI processes;
   calculating the CSI based on the configuration for the CSI process; and
   feeding the calculated CSI back to a TP, wherein
   for a CSI process which supports non-coordinated multi-point (COMP) transmission, no inheritance is configured,
   for a CSI process which supports non-coherent joint transmission (JT) and frequency-domain dynamic point selection/dynamic point blanking (DPS/DPB) transmission, an RI inheritance is configured and no SB inheritance is configured,
   for a CSI process which supports independent multi-point transmissions, no RI inheritance is configured and an SB inheritance is configured, and/or
   for a CSI process which supports coherent JT transmission, an RI inheritance and an SB inheritance are configured.

* * * * *